United States Patent
Shrivastava

(10) Patent No.: US 12,379,945 B2
(45) Date of Patent: Aug. 5, 2025

(54) ROBOTIC PROCESS AUTOMATION ARCHITECTURES AND PROCESSES FOR HOSTING, MONITORING, AND RETRAINING MACHINE LEARNING MODELS

(71) Applicant: UiPath, Inc., New York, NY (US)

(72) Inventor: Shashank Shrivastava, Bangalore (IN)

(73) Assignee: UiPath, Inc., New York, NY (US)

( * ) Notice: Subject to any disclaimer, the term of this patent is extended or adjusted under 35 U.S.C. 154(b) by 624 days.

(21) Appl. No.: 17/143,392

(22) Filed: Jan. 7, 2021

(65) Prior Publication Data
US 2022/0164700 A1    May 26, 2022

(30) Foreign Application Priority Data

Nov. 25, 2020  (IN) .............................. 202011051236
Nov. 25, 2020  (IN) .............................. 202011051237

(51) Int. Cl.
*G06F 9/451*    (2018.01)
*G05B 19/04*    (2006.01)
(Continued)

(52) U.S. Cl.
CPC ............. *G06F 9/451* (2018.02); *G05B 19/04* (2013.01); *G06F 8/61* (2013.01); *G06F 21/602* (2013.01); *G06F 21/6218* (2013.01); *G06F 30/27* (2020.01); *G06N 3/008* (2013.01); *G06N 3/10* (2013.01); *G06N 3/105* (2013.01); *G06N 20/00* (2019.01); *G06F 2212/402* (2013.01); *G06F 2221/2107* (2013.01)

(58) Field of Classification Search
CPC . G06F 30/27; G06F 8/61; G06F 9/451; G06F 21/602; G06F 21/6218; G06N 20/00; G06N 3/008; G06N 3/105; G06N 3/10
See application file for complete search history.

(56) References Cited

U.S. PATENT DOCUMENTS 7,792,353 B2   9/2010 Forman et al.
10,623,233 B1 *   4/2020 McConnell ............. H04L 43/20
(Continued)

FOREIGN PATENT DOCUMENTS

WO   2020061699 A1   4/2020
WO   2020227429 A1   11/2020

OTHER PUBLICATIONS

Mao et al., "Speculative Container Scheduling for Deep Learning Applications in a Kubernetes Cluster" Oct. 21, 2020, arXiv: 2010.11307v1, pp. 1-11. (Year: 2020).*

(Continued)

*Primary Examiner* — Miranda M Huang
*Assistant Examiner* — Chase P. Hinckley
(74) *Attorney, Agent, or Firm* — LeonardPatel PC; Michael A. Leonard, II; Sheetal S. Patel

(57) ABSTRACT

Robotic process automation (RPA) architectures and processes for hosting, monitoring, and retraining ML machine learning (ML) models are disclosed. Retraining is an important part of the ML model lifecycle. The retraining may depend on the type of the ML model and the data on which the ML model will be trained. A secure storage layer may be used to store data from RPA robots for retraining. This retraining may be performed automatically, remotely, and without user involvement.

22 Claims, 10 Drawing Sheets

(51) Int. Cl.
*G06F 8/61* (2018.01)
*G06F 21/60* (2013.01)
*G06F 21/62* (2013.01)
*G06F 30/27* (2020.01)
*G06N 3/008* (2023.01)
*G06N 3/10* (2006.01)
*G06N 20/00* (2019.01)

(56) References Cited

U.S. PATENT DOCUMENTS

| | | | |
|---|---|---|---|
| 10,710,239 | B2 | 7/2020 | Safary et al. |
| 10,733,329 | B1 | 8/2020 | Ragupathy et al. |
| 10,789,157 | B2 | 9/2020 | Jain et al. |
| 10,802,889 | B1* | 10/2020 | Ganesan ............... G06F 9/5005 |
| 10,817,314 | B1 | 10/2020 | Ganesan et al. |
| 10,963,692 | B1* | 3/2021 | Corcoran ............ G06V 30/414 |
| 11,182,178 | B1* | 11/2021 | Singh .................... G06N 3/045 |
| 11,250,097 | B1* | 2/2022 | Clarke ............... G06F 16/9535 |
| 11,461,119 | B2 | 10/2022 | Lewis |
| 11,613,008 | B2* | 3/2023 | Han ...................... G06N 3/047 |
| | | | 700/250 |
| 11,642,783 | B2* | 5/2023 | Han ........................ G06N 5/04 |
| | | | 700/250 |
| 12,159,203 | B1* | 12/2024 | Shukla .................. G06N 20/00 |
| 2005/0033709 | A1 | 2/2005 | Meng et al. |
| 2016/0358101 | A1 | 12/2016 | Bowers et al. |
| 2017/0352041 | A1* | 12/2017 | Ramamurthy ......... G06N 5/043 |
| 2018/0089591 | A1 | 3/2018 | Zeiler et al. |
| 2019/0138938 | A1 | 5/2019 | Vasseur et al. |
| 2019/0138946 | A1 | 5/2019 | Asher et al. |
| 2019/0156247 | A1 | 5/2019 | Faulhaber, Jr. et al. |
| 2019/0180746 | A1* | 6/2019 | Diwan .................. G06F 16/252 |
| 2019/0324781 | A1 | 10/2019 | Ramamurthy et al. |
| 2019/0332508 | A1* | 10/2019 | Goyal ................. G06F 11/3414 |
| 2020/0019882 | A1 | 1/2020 | Garg et al. |
| 2020/0034745 | A1 | 1/2020 | Nagpal et al. |
| 2020/0065334 | A1* | 2/2020 | Rodriguez .......... H04M 3/5183 |
| 2020/0067923 | A1* | 2/2020 | Dasari .................. H04L 63/104 |
| 2020/0111023 | A1 | 4/2020 | Murugappan et al. |
| 2020/0134374 | A1 | 4/2020 | Oros |
| 2020/0206920 | A1 | 7/2020 | Ma et al. |
| 2020/0234183 | A1* | 7/2020 | Ghatage ................. G06N 3/044 |
| 2020/0272920 | A1* | 8/2020 | Liu ......................... G06N 5/043 |
| 2020/0349452 | A1 | 11/2020 | Ragavan et al. |
| 2020/0364083 | A1* | 11/2020 | Walby ............... G06Q 10/0631 |
| 2020/0387358 | A1 | 12/2020 | Chae |
| 2021/0029129 | A1 | 1/2021 | Gupta et al. |
| 2021/0075749 | A1* | 3/2021 | Viswanathan ......... G06N 20/00 |
| 2021/0109896 | A1* | 4/2021 | Shemer ............... G06F 11/1471 |
| 2021/0117895 | A1 | 4/2021 | Tondevold et al. |
| 2021/0142233 | A1* | 5/2021 | Masood ................. G06N 3/088 |
| 2021/0150411 | A1 | 5/2021 | Coenders et al. |
| 2021/0303381 | A1* | 9/2021 | Baldassarre ............. G06N 5/04 |
| 2021/0304064 | A1* | 9/2021 | Mudi ...................... G06N 3/044 |
| 2021/0326717 | A1 | 10/2021 | Mueller et al. |
| 2021/0334817 | A1* | 10/2021 | Boston ............... H04L 63/0442 |
| 2021/0342736 | A1* | 11/2021 | Singh ...................... G06N 5/02 |
| 2021/0357757 | A1 | 11/2021 | Nguyen |
| 2021/0374479 | A1* | 12/2021 | Zambetti, Jr. ......... G06F 18/217 |
| 2021/0390405 | A1* | 12/2021 | Choi ....................... G06N 3/045 |
| 2022/0012134 | A1 | 1/2022 | Chatterjee et al. |
| 2022/0019195 | A1* | 1/2022 | Yu ........................... H04L 51/02 |
| 2022/0028010 | A1 | 1/2022 | Jeske et al. |
| 2022/0032457 | A1* | 2/2022 | Anand ................... G06V 40/20 |
| 2022/0046292 | A1 | 2/2022 | Nair et al. |
| 2022/0067573 | A1* | 3/2022 | Munguia Tapia .. G06F 11/3495 |
| 2022/0083330 | A1 | 3/2022 | Monakova |
| 2022/0083354 | A1* | 3/2022 | Singh ..................... G06F 9/451 |
| 2022/0094606 | A1* | 3/2022 | Casey .................... H04L 43/04 |
| 2022/0107622 | A1* | 4/2022 | Monakova .......... G05B 19/4155 |
| 2022/0107744 | A1* | 4/2022 | Capelo .................. G06N 20/00 |
| 2022/0114249 | A1 | 4/2022 | Grancharov et al. |
| 2022/0116485 | A1* | 4/2022 | Gandhi ................. H04L 51/216 |
| 2022/0121982 | A1* | 4/2022 | Rajagopalan .......... G06N 20/00 |
| 2022/0124000 | A1* | 4/2022 | Prasad .............. G06F 18/24147 |
| 2022/0147934 | A1* | 5/2022 | Chandrashekar ....... G06F 40/20 |
| 2022/0156300 | A1* | 5/2022 | Paruchuri ............. G06F 16/322 |
| 2022/0300336 | A1* | 9/2022 | Major ................... G06F 9/5038 |
| 2022/0326974 | A1 | 10/2022 | Bond et al. |
| 2024/0025034 | A1* | 1/2024 | Lachenmayr .............. B25J 3/00 |

OTHER PUBLICATIONS

Morales, Juan, "Kubernetes: the technological piece to ensure RPA high availability" Sep. 20, 2018, pp. 1-8. (Year: 2018).*
Chakraborti et al., "From Robotic Process Automation to Intelligent Process Automation" Jul. 27, 2020, arXiv: 2007.13257v1, pp. 1-14. (Year: 2020).*
Agostinelli et al., "Toward Intelligent Robotic Process Automation for BPMers" Jan. 3, 2020, arXiv: 2001.00804v1, pp. 1-7. (Year: 2020).*
Leno et al., "Identifying Candidate Routines for Robotic Process Automation from Unsegmented UI Logs" Aug. 27, 2020, arXiv: 2008.05782v2, pp. 1-8. (Year: 2020).*
Wroblewska et al., "Robotic Process Automation of Unstructured Data with Machine Learning" 2018, pp. 9-16. (Year: 2018).*
Kopec et al., "Hybrid Approach to Automation, RPA and Machine Learning: a Method for the Human-centered Design of Software Robots" Nov. 6, 2018, arXiv: 1811.02213v1, pp. 1-5. (Year: 2018).*
Masood et Hashmi, "Cognitive Robotics Process Automation: Automate This!" Mar. 28, 2019, Chapter 5 in 'Cognitive Computing Recipes: Artificial Intelligence Solutions Using Microsoft Cognitive Services and TensorFlow' Springer, pp. 225-287. (Year: 2019).*
Masood et Hashmi, "Cognitive Computing Recipes: Artificial Intelligence Solutions Using Microsoft Cognitive Services and TensorFlow" Mar. 28, 2019, Springer, pp. i-407. (Year: 2019).*
Chao et Chollet, "Writing your own Callbacks" Mar. 20, 2019, pp. 1-12, online https://www.tensorflow.org/guide/keras/writing_your_own_callbacks. (Year: 2019).*
Oros, Andrei Robert, Ex Parte decision on appeal 2022-001922, Jul. 5, 2023, pp. 1-23. (Year: 2023).*
Pramod, Om "Callbacks: You Secret Weapon in Machine Learning" Mar. 6, 2024, pp. 1-22. (Year: 2024).*
Keras "Callbacks API" 2020, pp. 1-2, online at https://keras.io/api/callbacks/ (Year: 2020).*
AltexSoft, "How Robotic Process Automation (RPA) Applies Artificial Intelligence: Cognitive Automation, Technology, and Use Cases" Jul. 18, 2019, pp. 1-20. (Year: 2019).*
Bellman, et Goransson, "Intelligent Process Automation: Building the bridge between Robotic Process Automation and Artificial Intelligence" 2019, pp. i-83. (Year: 2019).*
Yatskiv et al., "Method of Robotic Process Automation in Software Testing using Artificial Intelligence" Sep.30, 2020, pp. 501-504. (Year: 2020).*
Martins et al., "Using machine learning for cognitive Robotic Process Automation (RPA)" Jun. 2020, pp. 1-6. (Year: 2020).*
Martinez-Rojas et al., "Towards a Taxonomy of Cognitive RPA Components" Sep. 3, 2020, pp. 1-15. (Year: 2020).*
Patel et al., "Customized Automated Email Response Bot using Machine Learning and Robotic Process Automation" Jan. 2019, pp. 1-7. (Year: 2019).*
Jayaram et al., "FfDL: A Flexible Multi-tenant Deep Learning Platform" Sep. 14, 2019, arXiv: 1909.06526v1, pp. 1-16. (Year: 2019).*
Boag et al., "Dependability in a Multi-tenant Multi-framework Deep Learning as-a-Service Platform" May 17, 2018, pp. 1-4. (Year: 2018).*
Wu et al., "Elastic Deep Learning in Multi-Tenant GPU Clusters" Nov. 30, 2019, arXiv: 1909.11985v2, pp. 1-12. (Year: 2019).*
Jeon et al., "Analysis of Large-Scale Multi-Tenant GPU Clusters for DNN Training Workloads" Aug. 8, 2019, pp. 1-14. (Year: 2019).*
International Search Report & Written Opinion, issued Feb. 16, 2022, PCT Patent Application No. PCT/US21/56924.
International Search Report & Written Opinion, issued Feb. 21, 2022, PCT Application No. PCT/US21/56925.
UiPath "About Pipelines" page available at https://docs.uipath.com/ai-fabric/v0/docs/about-pipelines (last accessed Nov. 13, 2020).

(56) References Cited

OTHER PUBLICATIONS

Wikipedia hyperparameter optimization page available at https://en.wikipedia.org/wiki/Hyperparameter_optimization (last accessed Nov. 13, 2020).
Blue Prism, "How Blue Prism Sets the Standard for Secure Robotic Process Automation" Jan. 2020, white paper, pp. 1-16. (2020).
Chase Paul Hinckley, "Non-Final Office Action", issued Jul. 18, 2023, U.S. Appl. No. 17/144,467.
Hamilton, et al., "Large-Scale Intelligent Microservices" Sep. 17, 2020, arXiv: 2009.08044v1, pp. 1-13, (2020).
Hannousse, et al., "Securing Microservices and Microservice Architectures: A Systematic Mapping Study" Jun. 22, 2020, arXiv: 2003.07262v2, pp. 1-21, (2020).
Morales, Juan Manuel Reina, "Kubernetes: the technological piece to ensure RPA high availability" Sep. 20, 2018, pp. 1-8. (Year: 2020).
Percival, Mark, "Encryption isn't going to solve your RPA security issues" Feb. 23, 2021, pp. 1-8, (2021).
Vishal Kumar, "SAP Intelligent RPA—Simplified API/Web Service Call" Sep. 23, 2020, pp. 1-17, (2020).
First Examination Report issued in Indian Application No. 202011051236 on Jul. 11, 2023.
First Examination Report issued in Indian Application No. 202011051237 on Jul. 10, 2023.
Chase Paul Hinckley, "Advisory Action", issued Feb. 27, 2024, U.S. Appl. No. 17/144,467.
Chase Paul Hinckley, "Final Office Action", issued Jan. 2, 2024, U.S. Appl. No. 17/144,467.
Chase Paul Hinckley, "Non-Final Office Action", issued Aug. 14, 2024, U.S. Appl. No. 17/144,467.
Chase Paul Hinckley, "Final Office Action", issued Jan. 21, 2025, U.S. Appl. No. 17/144,467.
Chase Paul Hinckley, "Notice of Allowance", issued May 7, 2025, U.S. Appl. No. 17/144,467.

\* cited by examiner

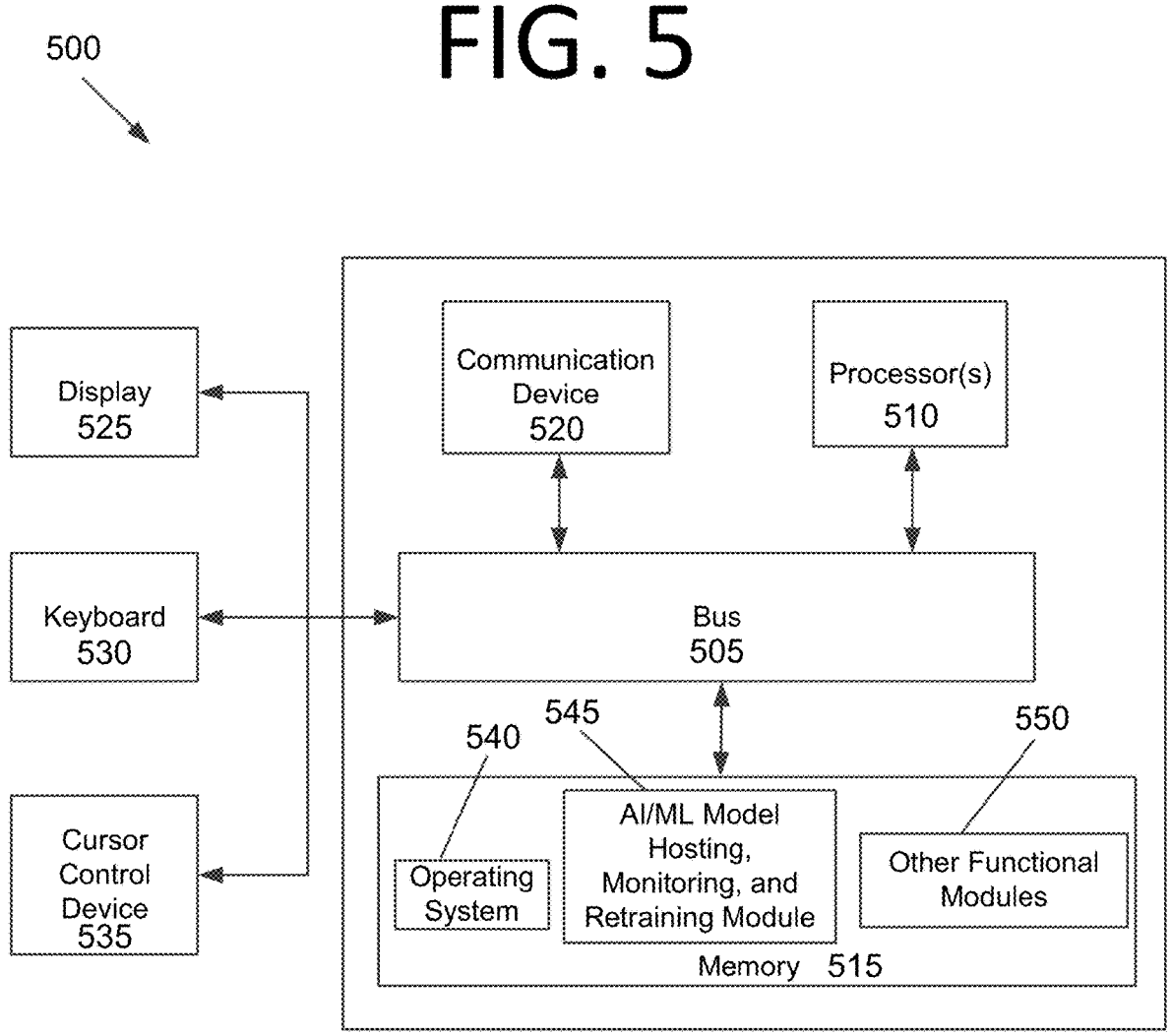

| Dashboard |
| Datasets |
| ML Packages |
| Pipelines |
| ML Skills |
| ML Logs |

Create New ML Pipeline Run

Pipeline Type

[ Full Pipeline Run ▼ ]

Choose Package

[ Choose ML Package ▼ ]

Choose Major Version

[ Choose Package Major Version ▼ ]

Choose Minor Version

[ Choose Package Minor Version ▼ ]

Choose Input Dataset

[ Choose Input Dataset ▼ ]

Choose Evaluation Dataset

[ Choose Evaluation Dataset ▼ ]

+ Add New

Environment Variable     Value

No Environment Variables

Enable GPU

◉ Run Now    ○ Time Based    ○ Recurring

[ Create ]  [ Cancel ]

ROBOTIC PROCESS AUTOMATION ARCHITECTURES AND PROCESSES FOR HOSTING, MONITORING, AND RETRAINING MACHINE LEARNING MODELS

CLAIM FOR PRIORITY UNDER 35 U.S.C. § 119

This application claims the benefit of Indian Patent Application No. 202011051237 filed Nov. 25, 2020, and Indian Patent Application No. 202011051236 filed Nov. 25, 2020. The subject matter of these earlier filed applications is hereby incorporated by reference in its entirety.

FIELD

The present invention generally relates to artificial intelligence (AI) for robotic process automation (RPA), and more specifically, to RPA architectures and processes for hosting, monitoring, and retraining machine learning (ML) models.

BACKGROUND

ML may be beneficial in RPA in order to automate steps that are difficult to define, have high variability, and require a probabilistic approach. However, ML in RPA currently lacks a practical operationalization vehicle. More specifically, ML should be seamlessly plugged into a business process to provide high velocity ML.

There are three significant barriers that prevent RPA and ML from seamlessly working together: operations, technology, and process. From an operations standpoint, the robotic operations center (ROC) and data science teams usually exist independently as silos with different skillsets, focuses, and business priorities. From a technology standpoint, RPA developers use an RPA platform to build, deploy, and manage automations performed by robots. Meanwhile, data scientists use dedicated ML modeling tools. Currently, publishing ML models as an application programming interface (API) is done by via platforms such as Azure®, Google®, and Amazon®. The ML model is exposed over HTTP. However, the user is required to write code to consume the API.

These tools, pipelines, and technologies are currently disconnected, and RPA and ML are managed as separate processes. When trying to incorporate ML models, the ROC does not know whether the model is producing the correct output or whether the model has been updated. Also, the data science team does not know whether the models are being used correctly and how useful the models are. For instance, data scientists do not currently have a straightforward mechanism to pass a schema definition to an RPA developer for inclusion in a workflow. It is also not known whether an endpoint for the RPA developer to deploy the ML model will change, or what other tasks the ML model is being used for. Furthermore, it is not known by the data scientist what caused a model to break (e.g., the data scientist may not know whether the endpoint is reachable) or how to get the model retrained and update the workflow if the input data changes. This creates a fundamental disconnect between RPA and ML. Accordingly, an improved approach to integration of RPA and ML, and ML model management, may be beneficial.

SUMMARY

Certain embodiments of the present invention may provide solutions to the problems and needs in the art that have not yet been fully identified, appreciated, or solved by current RPA technologies. For example, some embodiments of the present invention pertain to RPA architectures and processes for hosting, monitoring, and retraining ML models.

In an embodiment, a system includes one or more RPA robots configured to call one or more ML models. The system also includes an AI center configured to store the one or more ML models and to execute the one or more ML models upon a call from a respective RPA robot of the one or more RPA robots. The AI center is also configured to store a plurality of datasets for the ML models. Each dataset includes similar types of data in a logical or physical grouping. The AI center is further configured to retrain an ML model of the one or more ML models when a training condition is met or when retraining is manually requested using a subset of the plurality of datasets specified in a training configuration for the ML model and deploy the retrained ML model to be called by the one or more RPA robots.

In another embodiment, a non-transitory computer-readable medium stores a computer program. The computer program is configured to cause at least one processor to store a plurality of ML models and a plurality of datasets for the ML models. Each dataset includes similar types of data in a logical or physical grouping. The computer program is also configured to cause the at least one processor to retrain an ML model of the plurality of ML models when a training condition is met or when retraining is manually requested using a subset of the plurality of datasets specified in a training configuration for the ML model. The computer program is further configured to cause the at least one processor to deploy the retrained ML model by making the retrained ML model available to be called by one or more RPA robots.

In yet another embodiment, an AI center includes a training cluster configured to run one or more retraining pipelines and a core microservices cluster configured to perform create/read/update/delete (CRUD) operations for one or more ML models and to cause a retraining pipeline of the training cluster to initiate retraining of the one or more ML models. The AI center also includes an ML services cluster that is configured to execute the one or more ML models and provide results of the execution to calling RPA robots.

In still another embodiment, a system includes an AI center configured to store an ML model in a container and execute the stored ML model upon a call from an RPA robot. Contents of the container including the ML model are encrypted or obfuscated, the ML model is encrypted, or both.

In another embodiment, an AI center includes memory storing computer program instructions and at least one processor configured to execute the computer program instructions. The computer program instructions are configured to cause the at least one processor to store a plurality of datasets for a plurality of ML models. Each dataset includes similar types of data in a logical or physical grouping. The computer program instructions are also configured to cause the at least one processor to retrain an ML model of the plurality of ML models when a training condition is met using a subset of the plurality of datasets specified in a training configuration for the ML model or manually upon request. The computer program instructions are further configured to cause the at least one processor to receive one or more performance measures for the ML model being retrained and generate one or more scores for the one or more performance measures during the retraining. When the one or more scores improve, the computer program instructions are configured to cause the at least one processor to deploy the retrained ML model in place of a previous version of the ML model, or deploy the retrained version of the ML model, use both the retrained version of the ML model and the previous version of the ML model, and choose a result with a highest confidence.

In yet another embodiment, a computer-implemented method includes storing an ML model in a container, by an AI center. The computer-implemented method also includes executing the stored ML model, by the AI center, upon a call from an RPA robot. Contents of the container including the ML model are encrypted or obfuscated, the ML model is encrypted, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is an architectural diagram illustrating a computing system configured to host, monitor, and retrain ML models, or to operate as part of a system that does so, according to an embodiment of the present invention.

FIG. 8 illustrates a low code ML model pipeline creation interface, according to an embodiment of the present invention.

Unless otherwise indicated, similar reference characters denote corresponding features consistently throughout the attached drawings.

DETAILED DESCRIPTION OF THE EMBODIMENTS

Figure 1:
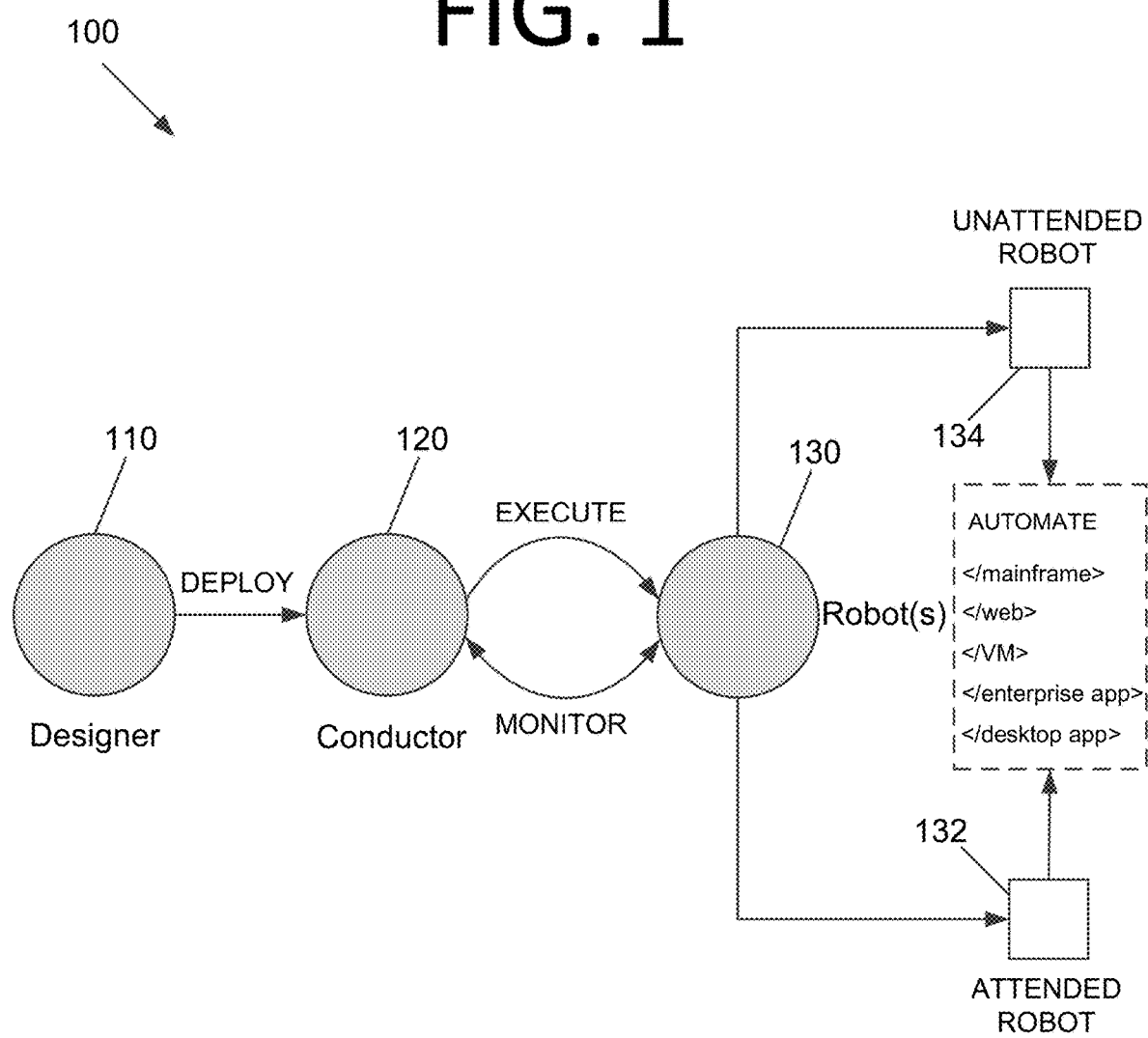
FIG. 1 is an architectural diagram illustrating an RPA system, according to an embodiment of the present invention.

Some embodiments pertain to RPA architectures and processes for hosting, monitoring, and retraining ML models. Retraining is an important part of the ML model lifecycle. The retraining may depend on the type of the ML model (e.g., the architecture of its algorithms) and the data on which the ML model will be trained. Some embodiments employ a secure tenant-level storage layer where tenants can include the data that they want to train on, and RPA robots can interact with this storage layer. Data may be collected over time (e.g., from user computing systems, servers, mobile devices, a combination thereof, etc.) and RPA robots can provide this data to the storage layer.

In some embodiments, the logic to retrain an ML model is based on the behavior of the ML model. ML models have different sensitivities towards data where data used for training/retraining may change the behavior of the ML model to varying degrees. Also, differing amounts of data may be needed for retraining from one ML model to another. Some ML models may be retrained using a few samples or data points whereas others may require hundreds, thousands, tens of thousands, or more samples or data points to effectively be trained/retrained. Furthermore, ML models may require different types of training data, such as numerical or text data, documents, screenshots, images, etc.

There is a data push activity in some embodiments that, if included in the workflow of an RPA robot, allows the RPA robot to automatically know where the storage is and upload data. Additionally or alternatively, an RPA robot could iterate through local data and/or data stored in a remote database and then send this data to the storage layer. However, in some embodiments, a human may use an application (e.g., a desktop application, a web browser, a mobile phone application, etc.) and upload the data from there. The data that is collected over time in the storage layer may allow grouping of different types of data (e.g., datasets). Similar types of data can be in logical or physical groupings. In some embodiments, users can choose the ML model they want to train, choose the dataset(s) on which they want to train the ML model, and choose when they want retraining to occur (e.g., on request or periodically).

In some embodiments, the datasets may be presented as pointers for the ML model to access the data in the dataset. The ML model may be retrained based on newer data that was not available the last time the ML model was trained, a combination of older data and newer data, the full dataset, etc. ML models may become more accurate over time as new data is obtained.

In some embodiments, users can choose the performance measure(s) that they would like to use, and the system generates one or more scores for the retrained ML model based on the selected performance measure(s). If the score(s) improve, the retrained ML model may be used in place of the previous version automatically if the user desires. Otherwise, the user may be notified and decide whether deploying the retrained version is desirable. In some embodiments, changes in the score may be tracked over time, highlighting both improvements and decreases in accuracy. A user or the system may then attempt to determine what is causing the negative drift.

In some embodiments, the amount of data that is used may be automatically adjusted. For instance, a training interface may be provided that allows users to adjust the number of data points, the frequency with which data is collected, the amount of data that is collected, triggers for retraining, and/or any other suitable training parameters without deviating from the scope of the invention.

The architecture of some embodiments may help to mitigate against or prevent intellectual property (IP) theft. For instance, some hosted ML models may not be provided by customers and may be proprietary to the company that provides the hosting architecture. These ML models may be made available and made callable to RPA robots of users by description only, and the ML models themselves may not be provided to the users or calling RPA robots. Rather, only the results of the ML model execution may be provided.

Some embodiments may mitigate against or prevent IP theft on customer sites. For instance, contents of a Docker™ container including an ML model may be encrypted or obfuscated, and/or the ML model itself may be encrypted. This may allow an RPA service provider to deploy an ML operations platform to a customer site with less risk that its own proprietary ML models (if included) will be copied or reverse engineered.

In some embodiments, a low code ML model deployment and training system for RPA may be provided. ML packages may be deployed in one click without coding by users. For instance, users could select from a catalog of ML models and deploy the selected ML models onto the target computing environment (e.g., a single node Kubernetes installation, a multi-node installation, etc.). In certain embodiments, users may train ML models with a single click of a button. Such embodiments may not require users to have technical knowledge, and they can plug this functionality into an RPA workflow without manual programming.

In some embodiments, users may chain multiple ML models together. This may be based on certain logic or a configuration. A network of ML models may be made available to users in an interface, potentially with ML models proposed that the system has determined to likely be the most pertinent. For instance, if a user is seeking to add an ML model for an activity that clicks a button, graphical element recognition ML models may be proposed. The user can then select ML models and chain them as appropriate to achieve a desired outcome.

Chaining of AI/ML models may occur on the client side, on the server side, or both. For client-side chaining, an RPA developer may manually develop the chaining logic in an RPA workflow. For instance, the RPA developer may include an activity that calls one AI/ML model, feed the model execution results to another activity in a sequence that feeds the results to another AI/ML model, etc.

On the server side, a graph may be provided with AI/ML models that can be connected to one another or a workflow may be created that can connect multiple AI/ML models together. For instance, a user could view the AI/ML models in the graph and chain them together as he or she desires. For both client-side and server-side chaining, users may create series AI/ML model connections, parallel connections, or a combination thereof.

In some embodiments, the functionality of the ML operations platform may be included on one computing system (e.g., a single server). This computing system may be located on a client site, for example, rather than being remotely hosted by an RPA service provider. Such a computing system may provide "cloud-like" functionality in the sense that it may provide the functionality locally that could otherwise be provided on a hosted cloud system. Such embodiments may be particularly useful for air gap scenarios where the computing system should be off the grid for regulatory or security reasons, such as for certain healthcare applications, financial services applications, etc. In such scenarios, certain privileged users and/or other computing systems may access the computing system providing the ML operations platform.

In some embodiments, an application with a labeling tool may be provided where users can mark/label data for training/retraining. The labeled data can then be pushed to a dataset for training/retraining. Validation capabilities may also be provided where users can verify the data.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
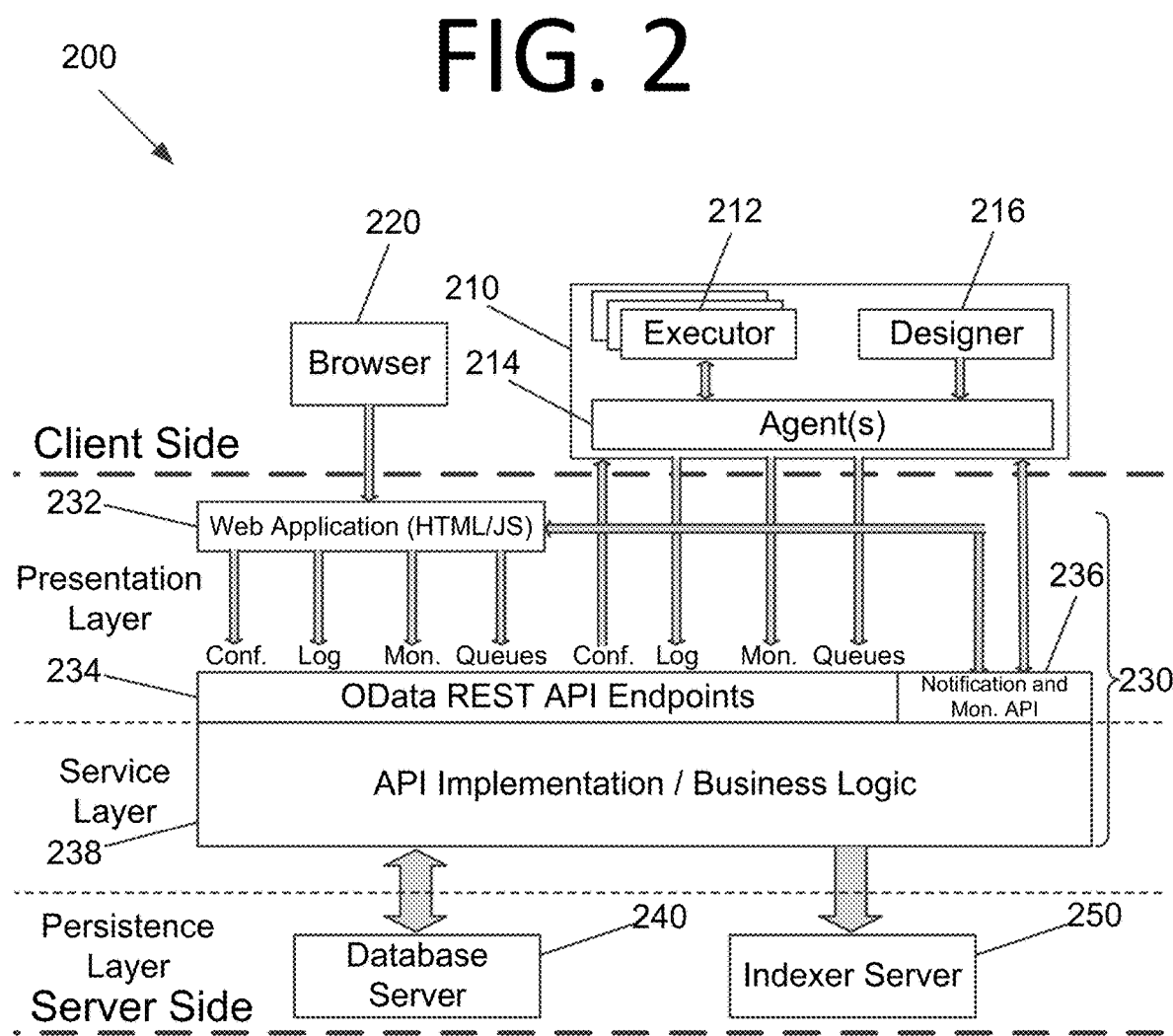
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
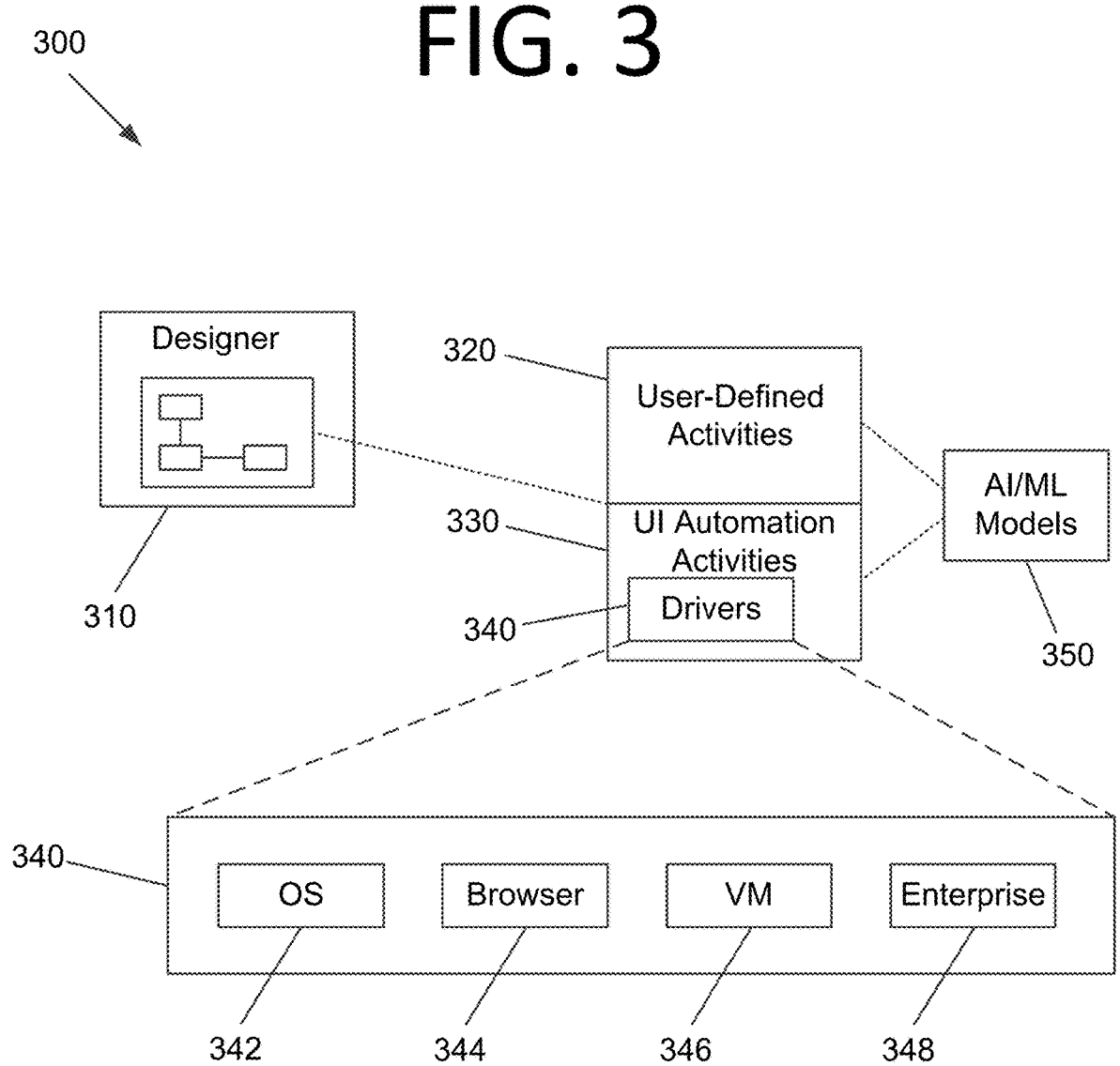
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
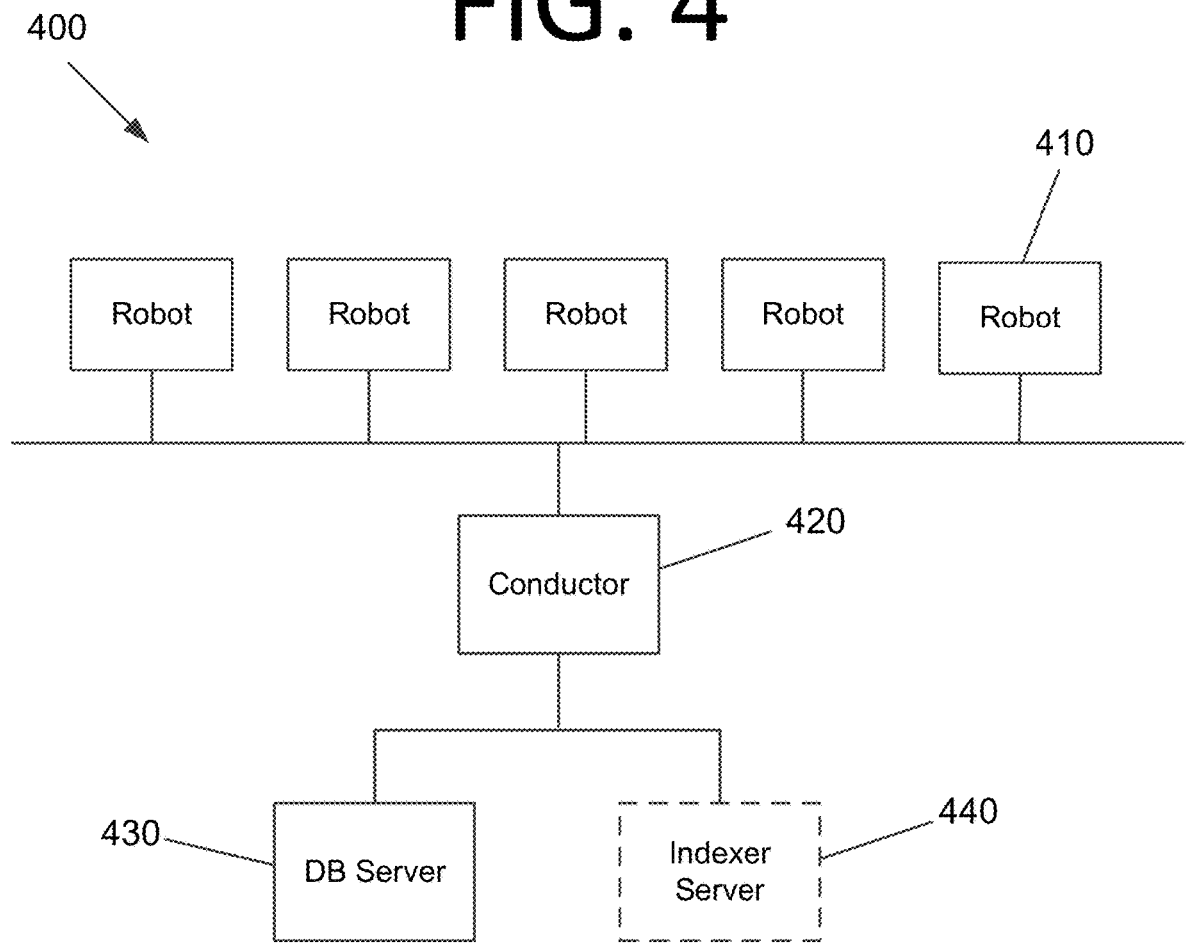
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

FIG. 5 is an architectural diagram illustrating a computing system 500 configured to host, monitor, and retrain AI/ML models, or to operate as part of a system that does so, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an AI/ML model hosting, monitoring, and retraining module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
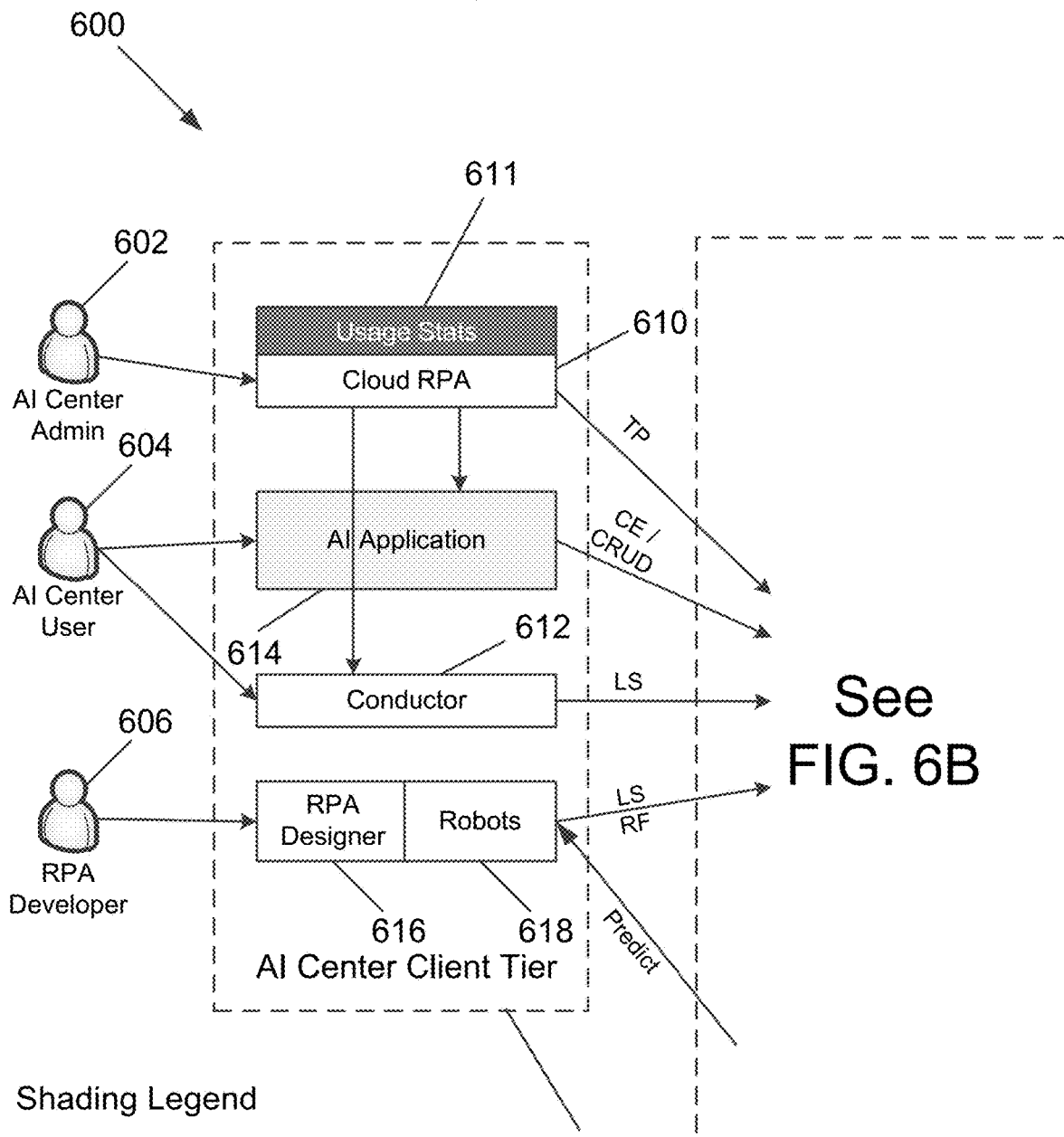
FIGS. 6A and 6B are architectural diagrams illustrating an RPA architecture for hosting, monitoring, and retraining ML models, according to an embodiment of the present invention.
Figure 6B:
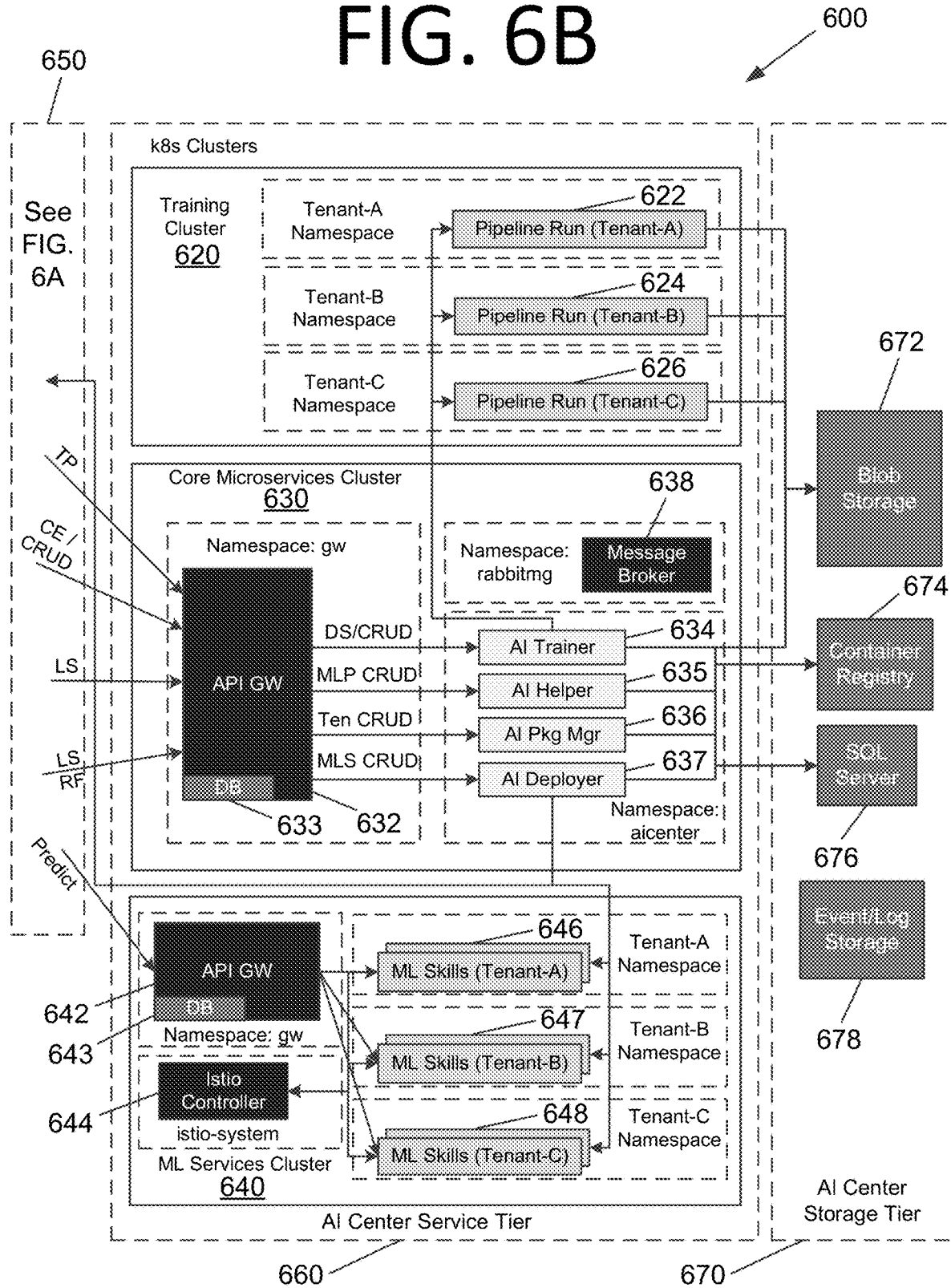

FIGS. 6A and 6B are architectural diagrams illustrating an RPA architecture 600 for hosting, monitoring, and retraining ML models, according to an embodiment of the present invention. Architecture 600 includes an AI center client tier 650, an AI center service tier 660, and an AI center storage tier 670. Services components in AI center service tier 660 are hosted inside Kubernetes (k8s) clusters in this embodiment. However, in some embodiments, a single k8s cluster may be used without deviating from the scope of the invention.

In client tier 650 in this embodiment, cloud RPA 610 is a cloud platform (e.g., a public cloud, a private cloud, a hybrid cloud, etc.) that provides software as a service (SaaS) where users, such as AI center user 604, can be registered and other users from the organization can be invited to use various services. Administrator 602 may have the ability to enable the AI center for users in the organization. Administrator 602 may also be able to allocate licenses to tenants/groups under that account. In some embodiments, typical interaction between cloud RPA 610 and the AI center will be enabling/disabling the AI center and allocation of licenses to tenants, which can be used to deploy ML skills. Usage statistics 611 supplied by AI center service tier 660 are also accessible by administrator 602 via cloud RPA 610.

User 604 (e.g., an ML engineer, a process engineer, or a data scientist) builds preconfigured ML models as part of AI application 614. In some embodiments, AI application 614 is a web application that provides a UI where a user can create and manage the lifecycle of ML models. An RPA developer 606 develops workflows with an RPA designer 616 (e.g., UiPath Studio™), which are then used to create RPA robots 618. RPA designer 616 and RPA robots 618 communicate with conductor 612 to fetch configurations and tokens to access the AI center services of AI center service tier 660. In some embodiments, only authenticated and authorized clients are able to obtain data from conductor 612. In the case that a client is authorized, a token may be provided enabling access to service tier 660 while the token is valid.

RPA robots 618 may obtain data from a computing system on which they are operating and/or any other data source or storage that they have access to. This data may be sent by RPA robots 618 to core microservices or ML skills through API gateways 632, 642, respectively. ML skills 646, 647, 648 may be consumer-ready, live deployments of ML packages, for example. The role of robots 618 in some embodiments is to take different types of data from different locations (e.g., data from blob/file storage and/or data streams) and feed it to ML skills, as well as to take the output of ML skills 646, 647, 648 and push it to desired storages and/or streams. RPA robots 618 can also upload data to datasets in some embodiments.

RPA developer 606 builds an RPA workflow using RPA designer 616, and user 604 builds ML models and uploads them to conductor 612 or AI application 614. Provisioning, create/read/update/delete (CRUD), and listing of ML skills (and the respective ML models) occurs via API gateway 632, which receives the metadata for the ML models from core services. Robots 618 also consume ML skills that executed models (e.g., ML skills 646, 647, 648) for their operations.

With respect to communications with API gateway 632, cloud RPA 610 sends tenant provisioning (TP) information. TP information in this embodiment is metadata about a tenant. A tenant is a logical unit of a customer that will own the ML models and data associated with that customer. This metadata may contain a reference to a conductor tenant, some basic details like name and location, etc.

AI application 614 performs CRUD for core entities (CE). Core entities in this embodiment are metadata tables stored in a database that have a relationship with other entities (e.g., the ML package, ML skill, tenant, project, audit logs, dataset, etc.). Conductor 612 or AI application 614 list ML skills (LS), and RPA robot(s) 618 list ML skills. Conductor 612 and/or AI application 614 may list ML skills to show the details to an administrator who is responsible for CRUD operations on ML skills whereas RPA robots 618 may show a read-only ML skills list so that an RPA developer can choose an ML skill and use it in an RPA workflow. RPA robot(s) also receive predictions from ML skills 646, 647, 648 via API gateway 642 of ML services cluster 640.

The services of service tier 694 in this embodiment include three k8s clusters—a training cluster 620, core microservices cluster 630, and ML services cluster 640. Core microservices cluster includes API gateway 632 that may use database 633 in this embodiment. Similarly, ML services cluster 640 includes API gateway 642 that may use database 643. Databases 633, 643 store configurations and rules for respective API gateways 632, 642 that may be used to validate incoming requests. API gateways 632, 642 are services that sit in front of the services/skills to prevent unauthorized use, abuse, theft, denial-of-service attacks, etc. Gateways 632, 642 validate the requests and can also apply more security policies to safeguard resources behind them. Gateways 632, 642 then pass information back for validated requests from services residing behind gateways 632, 642.

AI trainer 634 is a service that facilitates retraining of ML models via retraining pipelines 622, 624, 626 of training cluster 620. Retraining pipelines 622, 624, 626 are training jobs running in training cluster 620 for different tenants. AI trainer 634 instructs training cluster 620 to create training jobs with the requisite computing resources (e.g., CPU resource settings, GPU resource settings, RAM allocation, etc.) based on what the user has specified when creating retraining pipelines 622, 624, 626 in AI Application 614. Once a given training job is done, generated artifacts may be bushed to storage (e.g., blob storage 672) and the resources may be freed up.

AI helper 635 provides a collection of internal utility services, such as an async operation, state machine management, storage abstraction and access, etc. AI package manager 636 provides ML package and project CRUD and related REST APIs that will be called by conductor 612 and/or AI application 614. AI deployer 637 builds images of ML models (e.g., Docker™ images) with the requisite dependencies, pushes to container registry 674, and interacts with Kubernetes APIs of ML services cluster 640 to deploy the containers as ML skills of ML skills 646, 647, 648. Per the above, in some embodiments, Docker™ may be used to package the ML model images.

Core microservices cluster 630 includes a message broker 638, which is a multi-tenant server to provide publish/subscribe model-based messaging functionality to support long running and asynchronous tasks. Blob storage 672 provides multi-tenant storage to store ML models and other dependent files. Container registry 674 provides a multi-tenant private container registry to store docker images of customer-uploaded ML models. SQL server 676 stores metadata for the ML skills, ML packages, datasets, etc. Event/log storage 678 stores logs and metrics for applications/pods running in k8s clusters 620, 630, 640. While connections between k8s clusters 620, 630, 640 and event/log storage 678 exist, they are not shown in FIG. 6B.

A service mesh controller 644 (e.g., Istio™) provides service mesh functionality, such as traffic routing rules, monitoring, etc., for ML skills 646, 647, 648. What can ingress into and egress out of ML skills 646, 647, 648 is controlled by service mesh controller 644. Service mesh controller 644 pushes networking and monitoring policies for ML skills. For example, service mesh controller 644 may control Internet Protocol (IP) addresses that requests can come from, block viruses, block customers from downloading proprietary code and/or accessing certain ports, etc. API gateway 642 validates client requests for ML skills 646, 647, 648.

Once ML models are validated and deployed, and available to RPA robots 618 as ML skills 646, 647, 648, when RPA robots 618 reach an activity that uses an ML model during their operation, RPA robots 618 send the request and the associated data to API gateway 642 of ML services cluster 640. However, it should be noted that in some embodiments, the data for execution of the ML model may be supplemented by, or come entirely from, a different source than RPA robots 618.

The data for ML operations for a given RPA robot 618 is routed via service mesh controller 644 to the appropriate ML skill(s) 646, 647, 648. Output from ML skills 646, 647, 648 is then sent back through API gateway 642 to the appropriate RPA robot 618. The robot then uses this data to perform its ML activity. It should be noted that for certain ML activities, robots 618 may send data to and/or receive data from ML skills 646, 647, 648 multiple times.

However, once ML skills 646, 647, 648 have been deployed, further management of ML skills 646, 647, 648 is desirable. The retraining in some embodiments may depend on the type of the ML model and the data on which the ML model will be trained. Some embodiments employ AI center storage tier 670 where tenants can include the data that they want to train on, and RPA robots 618 can interact with AI center storage tier 670. Data may be collected over time and RPA robots 618 can provide this data to AI center storage tier 670. In some embodiments, training data is stored in blob storage 672.

For instance, RPA robots 618 may continue to push data to AI center storage tier 670 via an activity in the RPA workflow that allows respective RPA robot 618 to automatically know where AI center storage tier 670 is and upload data. Additionally or alternatively, RPA robots 618 could iterate through local data and/or data stored in a remote database outside of AI center storage tier 670 and then send this data to AI center storage tier 670. This data may be used for retraining ML models associated with ML skills 646, 647, 648. For instance, the performance of ML models of ML skills 646, 647, 648 may be monitored. If performance of an ML model of ML skills 646, 647, 648 falls below a certain threshold (e.g., a confidence of 60%, 80%, 95%, 99%, etc., depending on the application), AI trainer 634 may initiate retraining of that ML model using data stored in AI center storage tier 670. Additionally or alternatively, the ML models of ML skills 646, 647, 648 may be retrained after a certain amount of data is received for training that respective ML model, after a certain amount of time elapses, etc.

The data that is collected over time in AI center storage tier 670 may allow grouping of different types of data into datasets. Similar types of data can be in logical or physical groupings. In some embodiments, users can choose which ML model they want to train (if they have the appropriate access), choose and manage the dataset(s) on which they want to train the respective ML model, choose when they want retraining to occur (e.g., on request or periodically), create/monitor retraining pipelines, etc., via AI application 614.

In some embodiments, the datasets may be presented as pointers for the ML models to access the data in the dataset. The ML models of ML skills 646, 647, 648 may be retrained based on newer data that was not available the last time the respective ML model was trained, a combination of older data and newer data, the full dataset, etc. The ML models may become more accurate over time as new data is obtained.

In some embodiments, users can choose or define the performance measure(s) that they would like to use, and retraining pipelines 622, 624, 626 generate one or more scores for the retrained ML model based on the selected performance measure(s). Training cluster 620 provides a layer of abstraction that allows for management of resources for retraining (e.g., CPUs, GPUs, RAM, etc.). It should be noted that in some embodiments, multiple k8s clusters, multiple storage tiers, or both, may be used without deviating from the scope of the invention. If the score(s) improve, the retrained ML model may be used in place of the previous version automatically if the user desires. Otherwise, the user may be notified and decide whether deploying the retrained version is desirable. In some embodiments, changes in the score may be tracked over time, highlighting both improvements and decreases in accuracy. A user or training cluster 620 may then attempt to determine what is causing the negative drift.

In some embodiments, the amount of data that is used may be automatically adjusted. For instance, a training interface may be provided as part of conductor 612 or AI application 614 that allows users to adjust the number of data points, the frequency with which data is collected, the amount of data that is collected, triggers for retraining, and/or any other suitable training parameters without deviating from the scope of the invention.

The architecture of FIGS. 6A and 6B may help to mitigate against or prevent IP theft. For instance, at least some of the ML models of hosted ML skills 646, 647, 648 or other available hosted ML models may not be provided by customers in some embodiments and may be proprietary to the company that provides architecture 600. These ML models may be made available and made callable by RPA robots 618 by description only, and the proprietary ML models themselves may not be provided to the users or calling RPA robots 618. Rather, only the results of the ML model execution may be provided.

In some embodiments, a low code ML model deployment and training system for RPA may be provided. ML packages may be deployed in one click without coding by users 604 and/or RPA developers 606. For instance, users could select from a catalog of ML models and deploy the selected ML models onto the target computing environment (e.g., single node k8s installation, a multi-node k8s installation, etc.). In certain embodiments, users may train the ML models of ML skills 646, 647, 648 with a single click of a button. See, for example, low code ML model pipeline creation interface 800 of FIG. 8. Such embodiments may not require users 604 and/or RPA developers 606 to have technical knowledge, and they can trigger training/retraining without manual programming. However, this may not be fully true if the ML model packages belong to a customer and are not out-of-the-box ML models provided by an RPA provider, such as UiPath®. To build a trainable ML model package, customers who produce their own custom ML models may do some coding in addition to what they would do for prediction on the ML model package.

In some embodiments, RPA developers 606 may chain multiple ML models together. This may be based on certain logic or a configuration. A network of ML models may be made available to users in an interface (e.g., RPA designer application 606), potentially with ML models proposed that the system has determined to likely be the most pertinent. For instance, if RPA developer 606 is seeking to add an ML model for an activity that clicks a button using designer application 616, graphical element recognition ML models may be proposed by core microservices cluster 630, for example. RPA developer 606 can then select ML models and chain them as appropriate to achieve a desired outcome.

Figure 7:
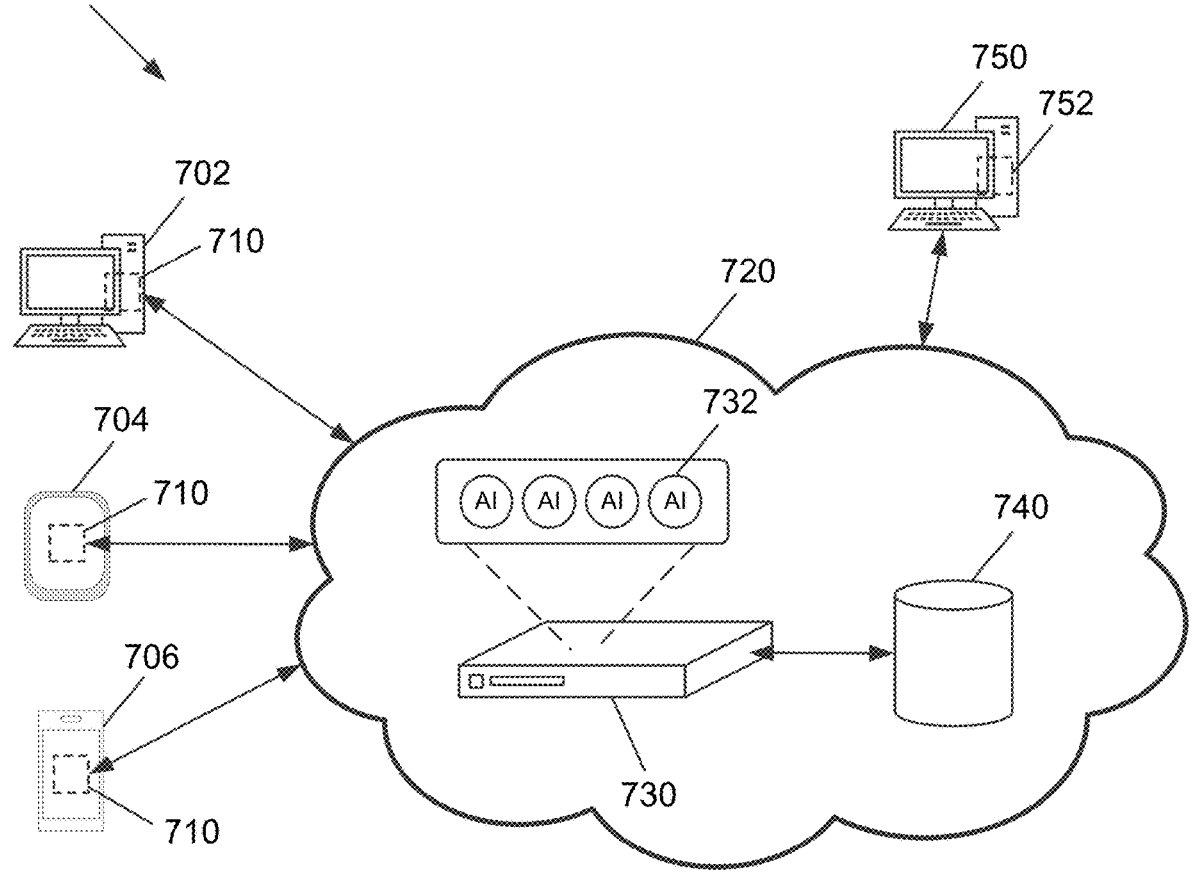
FIG. 7 is an architectural diagram illustrating a system configured to perform hosting, monitoring, and retraining ML models, according to an embodiment of the present invention.

FIG. 7 is an architectural diagram illustrating a system 700 configured to perform hosting, monitoring, and retraining ML models, according to an embodiment of the present invention. System 700 includes user computing systems, such as desktop computer 702, tablet 704, and smart phone 706. However, any desired computing system may be used without deviating from the scope of invention including, but not limited to, smart watches, laptop computers, etc. Also, while three user computing systems are shown in FIG. 7, any suitable number of computing systems may be used without deviating from the scope of the invention. For instance, in some embodiments, dozens, hundreds, thousands, or millions of computing systems may be used.

Each computing system 702, 704, 706 has an RPA robot 710 that collects data to send to a database (not shown) and/or executes AI/ML model(s) in the performance of certain tasks (e.g., one or more of AI/ML models 732, either chained or unchained). For example, one or more of RPA robots 710 may use AI/ML models that are trained to use CV to recognize what the user is doing on the respective computing system. Computing systems 702, 704, 706 send information via a network 720 (e.g., a local area network (LAN), a mobile communications network, a satellite communications network, the Internet, any combination thereof, etc.) to a server 730. In some embodiments, server 730 may be part of a public cloud architecture, a private cloud architecture, a hybrid cloud architecture, etc. In certain embodiments, server 730 may host multiple software-based servers on a single computing system 730. In some embodiments, server 730 may be implemented via one or more virtual machines (VMs). In certain embodiments, server 730 may be an "air-gapped" server that does not have Internet connectivity. Server 730 may be one machine that provides AI center functionality or a cluster of machines in some embodiments. Server 730 includes AI/ML models 732 in this embodiment that are called by one or more of RPA robots 710 to provide information that assists the respective calling RPA robot in completing an automation. In some embodiments, AI/ML models 732 called by RPA robots 710 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to identify sequences of user interactions.

Once deployed, retraining of AI/ML models 732 may be desirable. However, deployment of an ML model or ML skill may not be a prerequisite for training in some embodiments. Indeed, some ML models need to be trained before being deployed. The retraining in some embodiments may depend on the type of the ML model and the data on which the ML model will be trained. Some embodiments employ a secure tenant-level storage layer (e.g., as part of database 740) where tenants can include the data that they want to train on, and one or more of RPA robots 710 can interact with this storage layer. Data may be collected over time and one or more of RPA robots 710 can provide this data to database 740.

For instance, one or more of RPA robots 732 may continue to push data to database 740 via an activity in the RPA workflow that allows respective RPA robot 710 to automatically know where database 740 is and upload data. Additionally or alternatively, RPA robots 710 could iterate through local data and/or data stored in another remote database and then send this data to database 740. This data may be used for retraining AI/ML models 732. For instance, server 730 may monitor the performance of AI/ML models 732. If performance of an AI/ML model 732 falls below a certain threshold (e.g., a confidence of 60%, 80%, 95%, 99%, etc., depending on the application), server 730 may initiate retraining of that AI/ML model 732 using data stored in database 740. Additionally or alternatively, AI/ML models 732 may be retrained after a certain amount of data is received for training that respective AI/ML model, after a certain amount of time elapses, etc.

The data that is collected over time in database 740 may allow grouping of different types of data into datasets. Similar types of data can be in logical or physical groupings. In some embodiments, users can choose which AI/ML model of AI/ML models 732 they want to train (if they have the appropriate access), choose the dataset(s) on which they want to train the respective AI/ML model, and choose when they want retraining to occur (e.g., on request or periodically).

In some embodiments, the datasets may be presented as pointers for AI/ML models 732 to access the data in the dataset. AI/ML models 732 may be retrained based on newer data that was not available the last time the respective AI/ML model was trained, a combination of older data and newer data, the full dataset, etc. AI/ML models 732 may become more accurate over time as new data is obtained.

In some embodiments, users can choose the performance measure(s) that they would like to use, and server 730 generates one or more scores for the retrained AI/ML model based on the selected performance measure(s). It should be noted that in some embodiments, multiple servers, multiple databases, or both, may be used without deviating from the scope of the invention. If the score(s) improve, the retrained AI/ML model may be deployed by server 730 for use in place of the previous version automatically. Alternatively, a user of computing system 750 may be notified and decide whether deploying the retrained version is desirable. In some embodiments, changes in the score may be tracked over time, highlighting both improvements and decreases in accuracy. The user of computing system 750 or server 730 may then attempt to determine what is causing the negative drift.

In some embodiments, the amount of data that is used may be automatically adjusted. For instance, a training interface 752 may be provided that allows the user of computing system 750 to adjust the number of data points, the frequency with which data is collected, the amount of data that is collected, triggers for retraining, and/or any other suitable training parameters without deviating from the scope of the invention.

The architecture of system 700 may help to mitigate against or prevent IP theft. For instance, at least some of hosted AI/ML models 732 may not be provided by a company of user computing systems 702, 704, 706. Such AI/ML models may be made available and made callable by RPA robots 710 by description only, and the proprietary AI/ML models themselves may not be provided to the users or calling RPA robots 710. Rather, only the results of the AI/ML model execution may be provided.

AI Layers

In some embodiments, multiple AI layers may be used. Each AI layer is an algorithm (or model) that runs on the data, and the AI model itself may be deep learning neural networks (DLNNs) of trained artificial "neurons" that are trained in training data. Layers may be run in series, in parallel, or a combination thereof.

The AI layers may include, but are not limited to, a sequence extraction layer, a clustering detection layer, a visual component detection layer, a text recognition layer (e.g., OCR), an audio-to-text translation layer, or any combination thereof. However, any desired number and type(s) of layers may be used without deviating from the scope of the invention. Using multiple layers may allow the system to develop a global picture of what is happening in the screens. For example, one AI layer could perform OCR, another could detect buttons, another could compare sequences, etc. Patterns may be determined individually by an AI layer or collectively by multiple AI layers.

FIG. 8 illustrates a low code ML model pipeline creation interface 800, according to an embodiment of the present invention. Interface 800 allows a user to create a new ML pipeline run without programming. For instance, the user can specify the pipeline type (e.g., training, evaluation, or full (training+evaluation)), the ML package, the ML package major and minor versions, the input dataset, and the evaluation dataset. In some embodiments, a training pipeline takes as input a package and a dataset and produces a new package version, an evaluation pipeline takes as input a package version and a dataset and produces a set of metrics and logs, and a full pipeline runs a processing function, a training pipeline, and immediately thereafter, an evaluation pipeline. Major versions of ML packages are the versions provided by the RPA provider or uploaded by the customer, whereas minor versions of ML packages are the versions that are generated when a major/minor version is trained using pipeline. Every training pipeline run produces a minor version of the ML package in some embodiments. The user can also add environment variables, choose whether to enable GPU training, and choose when the ML pipeline should run (e.g., now, based on a time, recurring, etc.). The environmental variables may include model-specific configurations that can be optionally be provided in addition to the data, for example, such as hyperparameters (e.g., the number of estimators, the number of epochs, etc.) that can be used by the ML model algorithm to tune the training job.

Figure 9:
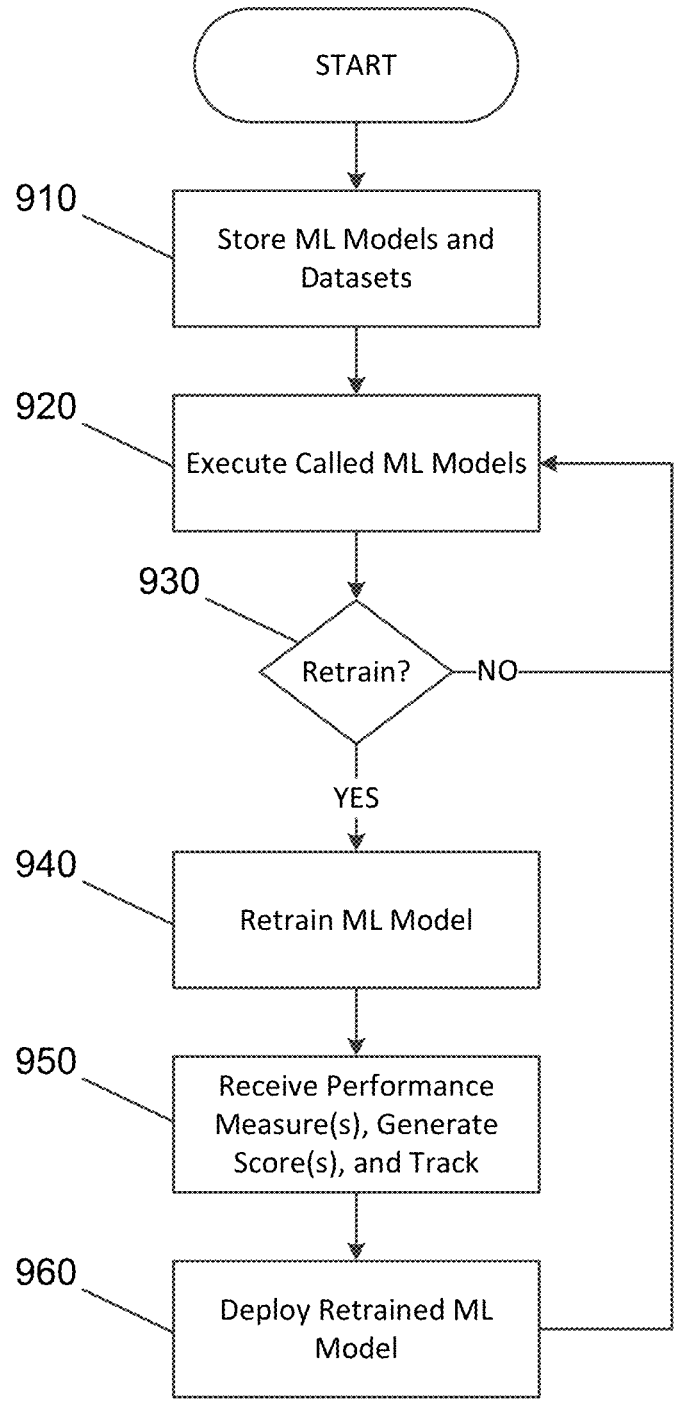
FIG. 9 is a flowchart illustrating a process for hosting, monitoring, and retraining ML models, according to an embodiment of the present invention.

FIG. 9 is a flowchart illustrating a process 900 for hosting, monitoring, and retraining ML models, according to an embodiment of the present invention. The process begins with storing ML models and datasets for the ML models at 910. In some embodiments, each dataset includes similar types of data in a logical or physical grouping. In certain embodiments, the datasets are provided by RPA robots that iterate through local data, data stored in a remote database, or both, and send the data to storage of an AI center for retraining. Stored ML models called by RPA robots are then executed at 920. In some embodiments, an RPA workflow of the calling RPA robots includes a data push activity that includes a location of storage for the respective RPA robot to upload data for retraining. In certain embodiments, an AI center or an activity of an RPA robot is configured to adjust a number of data points for retraining, a frequency with which retraining data is collected, an amount of retraining data that is collected, one or more triggers for retraining, or a combination thereof. In some embodiments, the RPA robots are permitted to call the models and receive results of execution of the ML models, but are not permitted to access the one or more ML models themselves. In certain embodiments, the ML model is stored in a container and contents of the container including the ML model are encrypted or obfuscated, the ML model is encrypted, or both.

If a retraining request is received or a retraining condition is met at 930, the ML model is retrained at 940 using a subset of the plurality of datasets specified in a training configuration for the ML model. In some embodiments, the plurality of datasets are presented as pointers to ML models during retraining and the ML model being retrained accesses the subset of the plurality of datasets for retraining via the respective pointers. One or more performance measures for the ML model being retrained are received, one or more scores for the one or more performance measures are generated during the retraining, and changes to the one or more scores are tracked over time at 950. The retrained ML model is then deployed at 960 and the process returns to step 920. In some embodiments, when the one or more scores improve, the AI center may be configured to deploy the retrained ML model in place of a previous version of the ML model. In certain embodiments, when the one or more scores improve, the AI center is configured to deploy the retrained version of the ML model, use both the retrained version of the ML model and the previous version of the ML model, and choose a result with a highest confidence. In some embodiments, process 900 may be carried out by a training cluster configured to run one or more retraining pipelines, a core microservices cluster configured to perform CRUD operations for the ML models and to cause a retraining pipeline of the training cluster to initiate retraining of the ML models, and an ML services cluster that is configured to execute the ML models and provide results of the execution to calling RPA robots.

In some embodiments, a low code ML model deployment and training application for RPA is used, where the low code ML model deployment and training application is configured to deploy ML packages in one click without coding by users. In certain embodiments, the low code ML model deployment and training application is configured to facilitate selection from a catalog of ML models and to deploy the selected ML models to the AI center as a target computing environment. In some embodiments, the low code ML model deployment and training application is configured to display a graph of ML models that are connectable to one another. In certain embodiments, the ML models in the graph are connectable in series, in parallel, or both.

The process steps performed in FIG. 9 may be performed by a computer program, encoding instructions for the processor(s) to perform at least part of the process(es) described in FIG. 9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
one or more robotic process automation (RPA) robots configured to:
call one or more machine learning (ML) models by respective activities of respective RPA workflows of the one or more RPA robots, the RPA workflows defining a controllable execution order over time and a relationship between a set of activities comprising the respective activities that call the one or more ML models by an expression of the respective activities, at least one activity of the set of activities configured to utilize at least one driver that facilitates interaction between the one or more RPA robots and software of respective computing systems,
receive results from the call to the one or more ML models, and
complete execution of the respective activities that call the one or more ML models; and
an artificial intelligence (AI) center comprising a plurality of physical servers configured to store the one or more ML models and to execute the one or more ML models upon a call from a respective RPA robot of the one or more RPA robots, wherein
the plurality of physical servers are configured to:
store a plurality of datasets for the ML models, each dataset comprising similar types of data in a logical or physical grouping, and
retrain an ML model of the one or more ML models responsive to a training condition being met or responsive to retraining being manually requested using a subset of the plurality of datasets specified in a training configuration for the ML model and deploy the retrained ML model to be called by the one or more RPA robots, wherein the ML model is retrained based on a confidence threshold.

2. The system of claim 1, wherein the plurality of physical servers comprise:
a training cluster configured to run one or more retraining pipelines;
a core microservices cluster configured to perform create/read/update/delete (CRUD) operations for the one or more ML models and to cause a retraining pipeline of the training cluster to initiate retraining of the one or more ML models; and
an ML services cluster that is configured to execute the one or more ML models and provide results of the execution to calling RPA robots of the one or more RPA robots.

3. The system of claim 1, wherein an RPA workflow of at least one of the one or more RPA robots comprises a data push activity that comprises a location of storage for the respective RPA robot to upload data for retraining.

4. The system of claim 1, wherein at least one RPA robot of the one or more RPA robots is configured to iterate through local data, data stored in a remote database, or both, and send the data to storage of the AI center for retraining.

5. The system of claim 1, wherein the plurality of datasets are presented as pointers to ML models during retraining, the ML model being retrained accessing the subset of the plurality of datasets for retraining via the respective pointers.

6. The system of claim 1, wherein the plurality of physical servers are configured to:
receive one or more performance measures for the ML model being retrained; and
generate one or more scores for the one or more performance measures during the retraining.

7. The system of claim 6, wherein changes to the one or more scores are tracked over time as retraining is performed multiple times.

8. The system of claim 1, wherein the plurality of physical servers are configured to adjust a number of data points for retraining, a frequency with which retraining data is collected, an amount of retraining data that is collected, one or more triggers for retraining, or a combination thereof.

9. The system of claim 1, wherein an RPA workflow of at least one of the one or more RPA robots is configured to adjust a number of data points for retraining, a frequency with which retraining data is collected, an amount of retraining data that is collected, one or more triggers for retraining, or a combination thereof.

10. The system of claim 1, wherein the plurality of physical servers permit the one or more RPA robots to call the one or more ML models and receive results of execution of the ML models, but does not permit the one or more RPA robots to access the one or more ML models themselves.

11. A non-transitory computer-readable medium storing a computer program, the computer program configured to cause at least one processor to:
store a plurality of machine learning (ML) models and a plurality of datasets for the ML models, each dataset comprising similar types of data in a logical or physical grouping;
retrain an ML model of the plurality of ML models responsive to a training condition being met or responsive to retraining being manually requested using a subset of the plurality of datasets specified in a training configuration for the ML model, wherein the ML model is retrained based on a confidence threshold; and
deploy the retrained ML model by making the retrained ML model available to be called by one or more robotic process automation (RPA) robots by respective activities of respective RPA workflows of the one or more RPA robots, the RPA workflows defining a controllable execution order over time and a relationship between a set of activities comprising the respective activities that call the one or more ML models by an expression of the respective activities, at least one activity of the set of activities configured to utilize at least one driver that facilitates interaction between the one or more RPA robots and software of respective computing systems.

12. The non-transitory computer-readable medium of claim 11, wherein the plurality of datasets are presented as pointers to ML models during retraining, the ML model being retrained accessing the subset of the plurality of datasets for retraining via the respective pointers.

13. The non-transitory computer-readable medium of claim 11, wherein the computer program is further configured to cause the at least one processor to:
receive one or more performance measures for the ML model being retrained; and
generate one or more scores for the one or more performance measures during the retraining.

14. The non-transitory computer-readable medium of claim 13, wherein changes to the one or more scores are tracked over time as retraining is performed multiple times.

15. The non-transitory computer-readable medium of claim 11, wherein the computer program is further configured to cause the at least one processor to:
adjust a number of data points for retraining, a frequency with which retraining data is collected, an amount of retraining data that is collected, one or more triggers for retraining, or a combination thereof.

16. The non-transitory computer-readable medium of claim 11, wherein the computer program is further configured to cause the at least one processor to:
permit the one or more RPA robots to call the plurality of ML models and receive results of execution of the ML models; and
prevent the one or more RPA robots from accessing at least one of the plurality of ML models themselves.

17. An artificial intelligence (AI) center, comprising:
a training cluster comprising at least one physical server configured to run one or more retraining pipelines, wherein the retraining pipelines are training jobs running in the training cluster for different tenants;
a core microservices cluster comprising at least one physical server configured to perform create/read/update/delete (CRUD) operations for one or more machine learning (ML) models and to cause a retraining pipeline of the training cluster to initiate retraining of the one or more ML models, wherein one or more of the ML models are retrained based on a confidence threshold; and
an ML services cluster comprising at least one physical server that is configured to execute the one or more ML models and provide results of the execution to calling robotic process automation (RPA) robots by respective activities of respective RPA workflows of the calling RPA robots, the RPA workflows defining a controllable execution order over time and a relationship between a set of activities comprising the respective activities that call the one or more ML models by an expression of the respective activities, at least one activity of the set of activities configured to utilize at least one driver that facilitates interaction between the calling RPA robots and software of respective computing systems.

18. The AI center of claim 17, wherein the at least one physical server of the training cluster is configured to retrain an ML model of the one or more ML models responsive to a training condition being met or responsive to retraining being manually requested using a subset of the plurality of datasets specified in a training configuration for the ML model.

19. The AI center of claim 18, wherein the at least one physical server of the core microservices cluster is configured to deploy the retrained ML model to the at least one physical server of the ML services cluster to be called by the RPA robots.

20. The AI center of claim 18, wherein the plurality of datasets are presented as pointers to ML models during retraining, the ML model being retrained accessing the subset of the plurality of datasets for retraining via the respective pointers.

21. The AI center of claim 17, wherein the at least one physical server of the training cluster is configured to adjust a number of data points for retraining, a frequency with which retraining data is collected, an amount of retraining data that is collected, one or more triggers for retraining, or a combination thereof.

22. The AI center of claim 17, wherein the at least one physical server of the ML services cluster permits the one or more RPA robots to call the one or more ML models and receive results of execution of the ML models, but does not permit the one or more RPA robots to access the one or more ML models themselves.

* * * * *